(12) United States Patent  
Enders

(10) Patent No.: US 6,497,253 B1  
(45) Date of Patent: Dec. 24, 2002

(54) HOLLOW BODY IN THE FORM OF A FLEXIBLE BAR

(75) Inventor: Silvia Enders, Baden-Baden (DE)

(73) Assignee: Aeroquip-Vickers International GmbH, Baden-Baden (DE)

( * ) Notice: Subject to any disclaimer, the term of this patent is extended or adjusted under 35 U.S.C. 154(b) by 0 days.

(21) Appl. No.: 09/762,731

(22) PCT Filed: Aug. 12, 1999

(86) PCT No.: PCT/EP99/05847

§ 371 (c)(1),  
(2), (4) Date: Apr. 5, 2001

(87) PCT Pub. No.: WO00/09927

PCT Pub. Date: Feb. 24, 2000

(30) Foreign Application Priority Data

Aug. 13, 1998 (DE) .......................... 198 37 494

(51) Int. Cl.[7] .............................. F16L 11/08
(52) U.S. Cl. .................... 138/125; 138/130; 138/153
(58) Field of Search ............... 138/124, 125, 138/129, 130, 153

(56) References Cited

U.S. PATENT DOCUMENTS

| 3,988,188 | A | * | 10/1976 | Johansen et al. ............ 138/125 |
| 4,091,843 | A | | 5/1978 | Mikes et al. |
| 4,105,819 | A | * | 8/1978 | Kotcharian ................ 428/213 |
| 4,137,949 | A | * | 2/1979 | Linko, III et al. .......... 138/125 |
| 4,204,562 | A | * | 5/1980 | Kelly ........................ 138/129 |
| 4,402,346 | A | * | 9/1983 | Cheetham et al. ........... 138/125 |
| 4,559,095 | A | | 12/1985 | Babbin |
| 4,842,024 | A | | 6/1989 | Palinchak |
| 4,870,995 | A | | 10/1989 | Igarashi et al. |
| 4,905,735 | A | | 3/1990 | Akiyoshi |
| 4,907,624 | A | * | 3/1990 | Jonasson ................... 138/125 |
| 4,998,564 | A | | 3/1991 | Igarashi et al. |
| 5,016,675 | A | | 5/1991 | Igarashi et al. |
| 5,093,166 | A | | 3/1992 | Nishimura |
| 5,145,628 | A | | 9/1992 | Karg et al. |
| 5,183,079 | A | * | 2/1993 | Blin ......................... 138/125 |
| 5,264,262 | A | | 11/1993 | Igarashi |
| 5,316,046 | A | | 5/1994 | Igarashi et al. |
| 5,348,779 | A | | 9/1994 | Igarashi |
| 5,462,091 | A | | 10/1995 | Saupe |
| 5,507,993 | A | | 4/1996 | Fortuin et al. |
| 5,621,070 | A | | 4/1997 | Howard, Jr. |
| 5,957,164 | A | | 9/1999 | Campbell |
| 6,029,712 | A | | 2/2000 | Dougherty |

FOREIGN PATENT DOCUMENTS

| DE | 4020798 | 1/1991 |
| DE | 19608318 | 8/1997 |
| EP | 375608 A1 | 6/1990 |
| EP | 0384995 A | 9/1990 |

OTHER PUBLICATIONS

Schiefer, Kurt, *Lexikon der Verfahrenstechnik*, 1970, pp. 236–239.

* cited by examiner

*Primary Examiner*—James Hook  
(74) *Attorney, Agent, or Firm*—Emch, Schaffer, Schaub & Porcello Co., L.P.A.

(57) ABSTRACT

A flexible continuous hollow element configured as a jacket enclosing a hollow space for the transport of media includes a blocking layer (26) which is an integral part of the jacket (12). The blocking layer is impermeable to volatile molecules of the medium to be transported and is configured as a fabric layer (28) enclosing the interior space (14) formed by the layer (18) of the jacket (12).

18 Claims, 2 Drawing Sheets

HOLLOW BODY IN THE FORM OF A FLEXIBLE BAR

Figure 1:
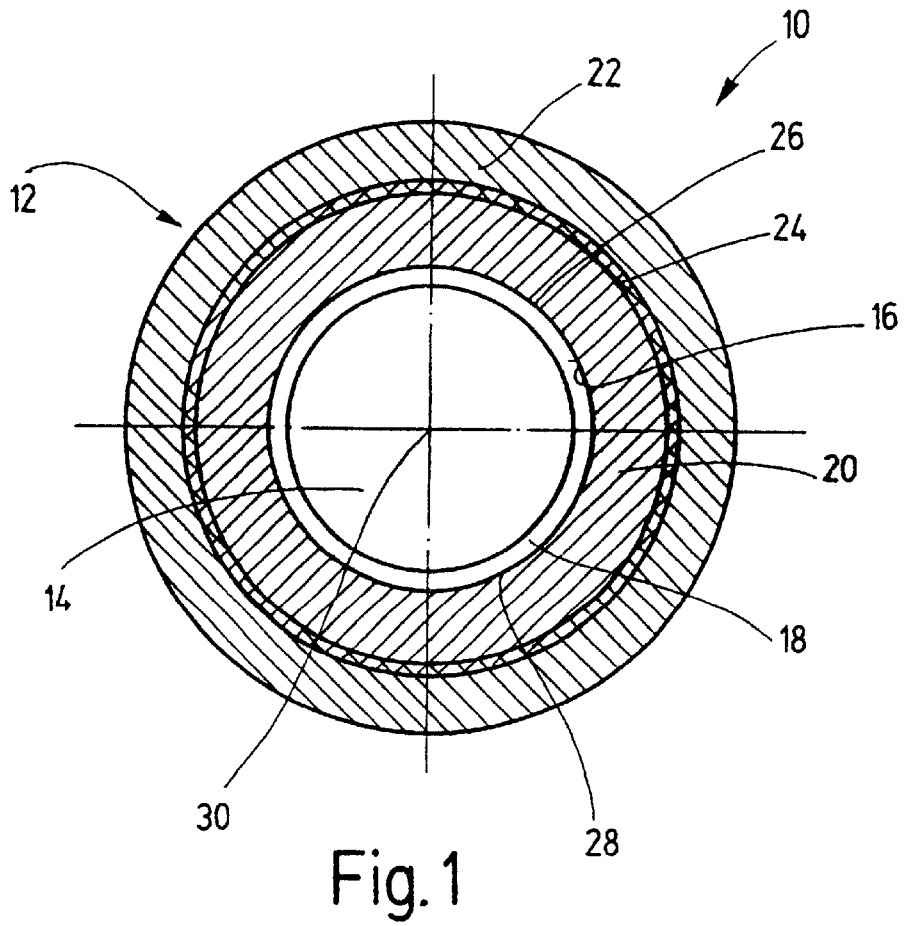

The invention herein relates to a flexible continuous hollow element, whereby the interior space is enclosed by a jacket to permit the transport of media.

Flexible continuous hollow elements of this generic type have been known. Hereinafter, such a continuous hollow element will also be called a hose such as is used in many technological fields for the transport of liquid or gaseous media. When used in air-conditioning systems, for example in motor vehicles, such hoses are used for the transport of coolants. Coolants have the property of being volatile and, if they reach the atmosphere of the earth, they can have harmful effects. In order to prevent such effects, natural coolants, for example $CO_2$, are to be used. Known coolant hoses have the disadvantage of being highly permeable to natural coolants, in particular $CO_2$, allowing the coolant to diffuse through the hose.

Fiber materials, in particular those that have been available under the Gortex tradename, have been generally known. Such fabrics exhibit unidirectional impermeability to water, specifically water vapor.

Therefore, the problem to be solved by the invention herein is to provide a flexible continuous hollow element of the general type as described that exhibits low permeability to $CO_2$ in particular.

In accordance with the invention herein this problem has been solved by a flexible continuous hollow element exhibiting the features of claim 1. Due to the fact that the jacket of the hollow element contains as an integral part a blocking layer, which is impermeable to the medium to be transported and which is formed by a fabric layer creating the interior space of the jacket, permeation through the flexible continuous hollow element is prevented or at least reduced to a negligibly low amount. Therefore, it is possible, in particular if the flexible continuous hollow element is to be used as coolant hose, to transport coolants in such a manner that the coolant cannot escape into the atmosphere. At the same time, a low permeation rate ensures the reliable function of the cooling system that is supplied with coolant.

In a preferred form of embodiment of the invention herein, the mesh width of the fabric layer is smaller than the size of the volatile molecules of the medium to be transported. Therefore, the advantage is achieved that, even after applying the fabric layer, a blocking layer has been created, which leads to the reduced permeability of the jacket.

In another preferred form of embodiment of the invention the fabric layer is woven in a direction radial and axial to the longitudinal axis of the hollow element, or the fabric layer is woven in a direction diagonal to the longitudinal axis of the hollow element. In each case, the alternating weave creates a mesh width that ensures the required impermeability to the volatile molecules of the medium which is to be transported.

Furthermore, considering the preferred form of embodiment of the invention herein, the fabric layer is placed around the jacket layer that forms the interior space, whereby, preferably, the fabric's longitudinal edges overlap in axial direction. As a result of this, the fabric layer can be applied in a simple layer on the jacket layer.

Furthermore, considering the preferred form of embodiment of the invention herein, the fabric layer is wound around the jacket layer. As a result of this, a flexible continuous hollow element of any desired length can be provided with the fabric layer forming the blocking layer, in that it is wound as a continuous web in the form of a spiral.

Another preferred form of embodiment of the invention herein provides that the fabric layer is woven on the jacket layer that forms the interior space. As a result of this, a particularly tight bond is created between the fabric layer and the interior layer.

A further preferred form of embodiment of the invention provides that the fabric layer is pulled as a shrinkable hose onto the interior layer of the jacket. Consequently, the previously woven shrinkable hose can be pulled over the interior layer, where said shrinkable hose—due to its elongation—adheres tightly to the interior layer of the jacket.

Furthermore, another preferred embodiment of the invention provides that the fabric layer consists of several layers. By superimposing several fabric layers, extremely small mesh widths are created which are impermeable even to relatively small volatile molecules. In so doing, the flexible hollow element exhibits extremely low permeability.

By configuring the blocking layer as a fabric layer, the overall flexibility of the continuous hollow element remains unimpaired by the blocking layer. Therefore, the fabric layer, due to its inherent properties, can readily adapt to bending stress created by the hollow cylinder, without impairing the effect of blocking the volatile molecules.

For example, a particularly suitable fabric layer is a microfiber fabric that can block low-molecular media. Furthermore, for example, semi-permeable membranes which are produced from a woven fiber fabric (microfiber weave) can be used, whereby these are at least unidirectionally impermeable to the low-molecular molecules of the coolant medium that is to be transported.

Additional preferred embodiments of the invention herein exhibit the remaining features as disclosed by the Subclaims.

Figures 2, 3:
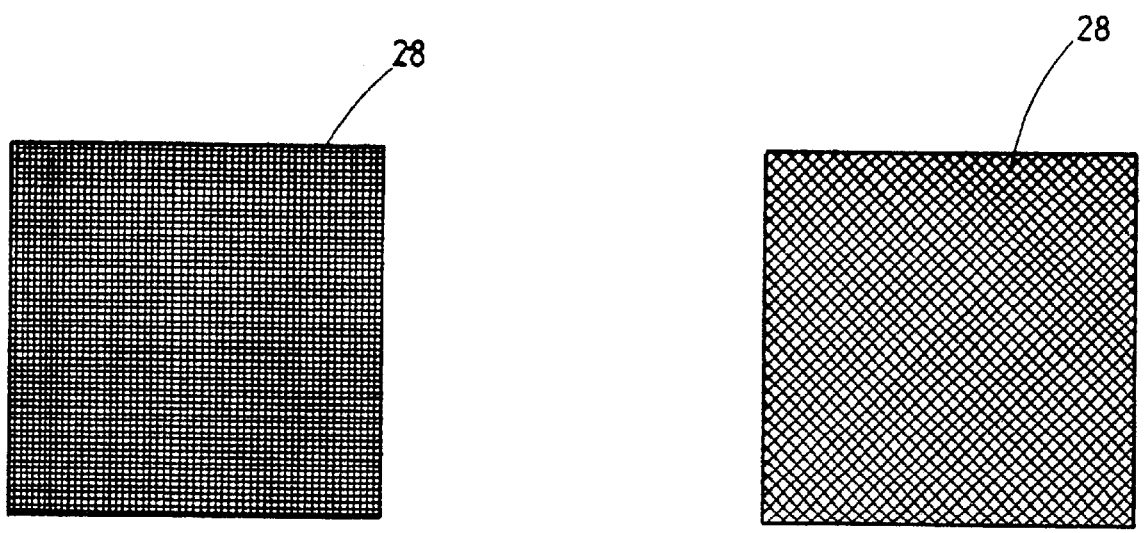
Figure 4:
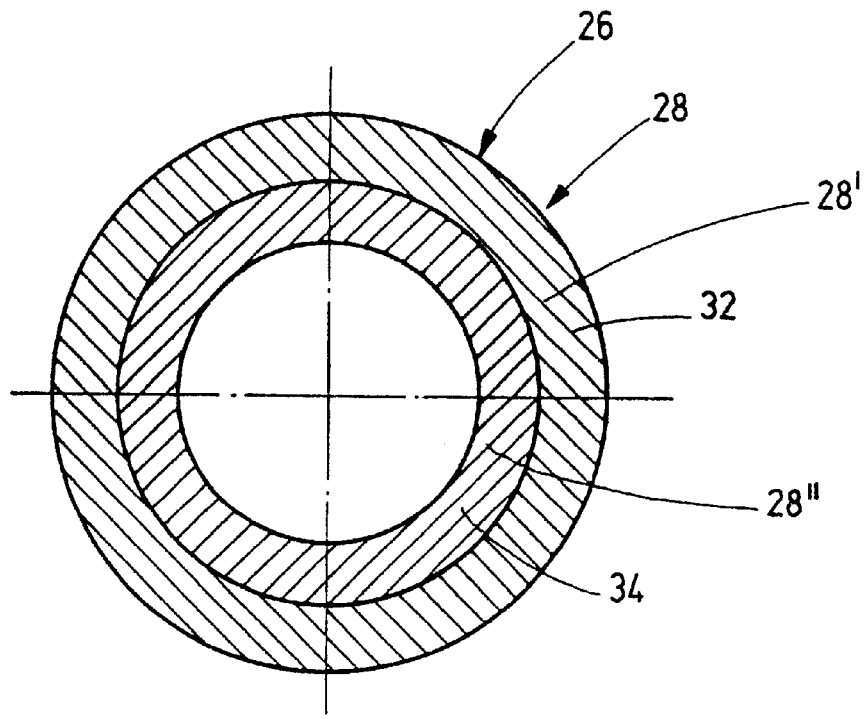
Figure 5:
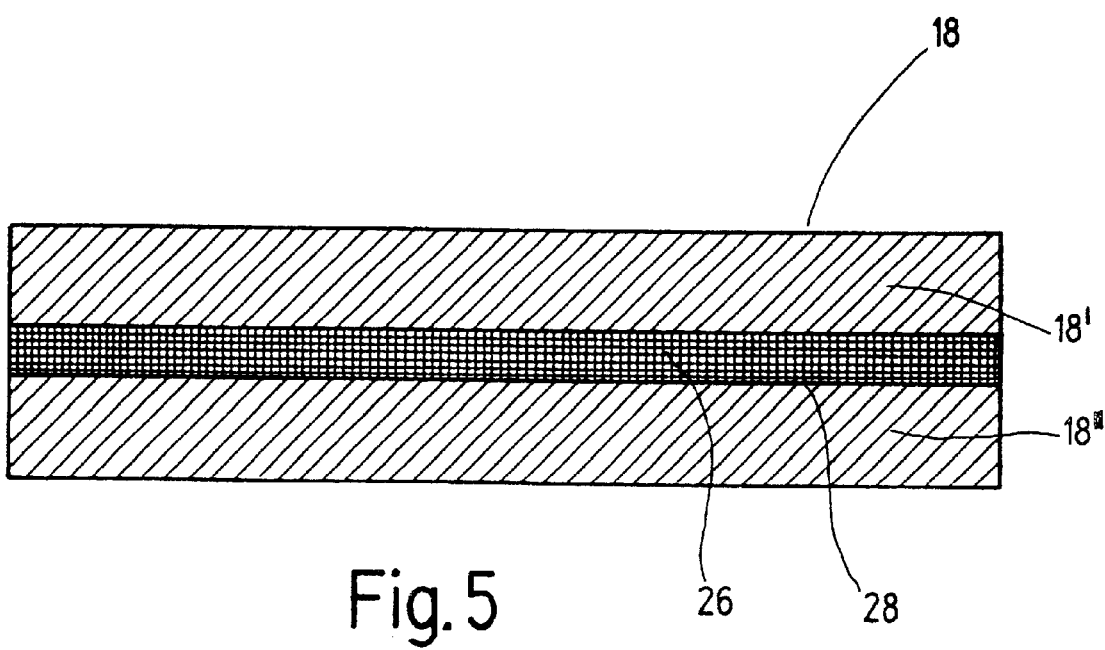

Hereinafter, the invention will be explained with the use of an example of embodiment and with reference to related drawings. They show:

FIG. 1 a cross-section of a coolant hose,

FIGS. 2 to 4 various embodiments of blocking layers,

FIG. 5 an arrangement of a blocking layer in a coolant hose.

FIG. 1 shows a cross-section of coolant hose 10. Coolant hose 10 comprises an overall jacket 10 enclosing an interior space 14. Jacket 12 consists of a flexible continuous hollow element that encloses an interior space 14, which preferably has the configuration of a cylinder with circular cross-section. In accordance with additional examples of embodiment, interior space 14 may also have a different cross-section, for example, be oval or the like. Jacket 12 consists of several layers. An interior layer 18 is covered with a middle layer 20, which is covered with an exterior layer 22. A reinforcement layer 24 is arranged between middle layer 20 and exterior layer 22. These layers 18, 20 and 22 of jacket 12 consist of a polymer material, for example. Reinforcement layer 24 consists of a flexible, fabric-reinforced layer, for example.

A blocking layer 26 is applied to the exterior jacket surface 16 of interior layer 18. Blocking layer 26 consists of a fabric layer 28 that can be configured in different ways as explained in detail with reference to the attached drawings.

Fabric layer 28, a section of which is shown by FIG. 2, may consist of filaments woven coaxially and axially to a longitudinal axis 30 of hollow element 10. In accordance with the form of embodiment shown by FIG. 3 it is possible to weave the filaments making up fabric layer 28 diagonally, for example, at an angle of 45°, with respect to longitudinal axis 30 of hollow element 10.

Independent of the selected form of embodiment, the mesh width of fabric layer 28 has been selected in such a manner that the volatile molecules of a coolant transported in interior space 14 of hollow element 10 are prevented from diffusing. One coolant that may be considered is carbon dioxide ($CO_2$), for example.

FIG. 4 shows another form of embodiment of blocking layer 26, which is configured as a fabric layer 28. FIG. 4 does not show the remainder of the layer assembly of jacket 12. It is obvious that blocking layer 26 consists of two layers 32 and 34 (respectively) of fabric layers 28' and 28" (respectively). In this case, for example, outer fabric layer 28' may be woven in a diagonal manner as shown by the example of embodiment of FIG. 3, and fabric layer 28 may be woven axially or radially as shown by the example of embodiment of FIG. 2. Of course, various other embodiments are conceivable, for example those in which both fabric layers 28' and 28" are woven diagonally, or axially, or radially. Fabric layers 28' and 28" are arranged relative to each other in such a manner that the overall blocking layer 26 exhibits the smallest possible mesh width, preventing diffusion of the transported medium. This ensures the low permeability of jacket 12 of hollow element 10.

For example, fabric layer 28 may be applied to interior layer 18 of the hollow element, in that said layer 28 is wound onto said layer 18 in the form of a spiral, slipped over it like a hose or placed around it in the form of a flat structure. In each case the entire surface area of interior layer 18 is enclosed by fabric layer 28, so that blocking layer 26 is continuous in order to keep the permeability of jacket 12 of hollow element 10 as low as possible.

FIG. 5 shows a sectional view of interior layer 18 of jacket 12, whereby fabric layer 28 forming the blocking layer 26 is embedded in said interior layer. This "embedding" may be achieved when the polymer matrix forming interior layers 18 is placed on both sides of fabric layer 28, which acts as support for said polymer matrix. As a result of this, partial layers 18' and 18", respectively, of interior layer 18 are formed; whereby fabric layer 28 forms an integral part of said partial layers. In this way, a particularly good adhesive bond between fabric layer 28 and layer 18 is achieved.

In accordance with other, not illustrated, examples of embodiment, fabric layer 28 may, for example, also be arranged between middle layer 20 and reinforcement layer 24 and/or reinforcement layer 24 and outer layer 22, for example. In each case the integration of blocking layer 26 into jacket 12 allows transportation of a coolant, whereby the volatile components of said coolant cannot diffuse through jacket 12. Due to blocking layer 26, said jacket 12 exhibits extremely low permeability to the molecules of the coolant to be transported. Additionally, the diffusion of molecules into interior space 14 through blocking layer 26 in reverse direction is prevented as well.

What is claimed is:

1. Flexible continuous hollow element configured as an interior space enclosed by a jacket in order to permit the transport of media, characterized in that a blocking layer (26) is an integral part of the jacket (12), whereby said blocking layer is impermeable to volatile molecules of the medium to be transported and is configured as a fabric layer (28) enclosing the interior space (14) formed by the layer (18) of the jacket (12), said fabric layer having a mesh width which is smaller in size than the size of the molecules of the medium to be transported.

2. Flexible continuous hollow element according to claim 1 wherein said mesh size is smaller than volatile molecules of $CO_2$.

3. A flexible continuous hollow element in accordance with claim 1, characterized in that said jacket includes at least one layer of a polymer material.

4. A flexible continuous hollow element in accordance with claim 1, characterized in that at least one reinforcement layer (24) is arranged between layers of the jacket.

5. A flexible continuous hollow element in accordance with claim 1, characterized in that said flexible continuous hollow element is impermeable to carbon dioxide coolant.

6. A flexible hose for the transport of media comprising an interior layer, a blocking layer and a third layer outwardly from said blocking layer, said interior layer defining a space for the flow of said medium characterized in that said blocking layer is impermeable to volatile molecules of the medium to be transported and is configured as a fabric layer (28) encircling said space said fabric layer having a mesh size smaller than the size of said volatile molecules.

7. A flexible hose in accordance with claim 6, characterized in that said fabric layer is woven radially and axially with respect to the longitudinal axis of said interior layer.

8. A flexible hose in accordance with claim 6, characterized in that said fabric layer (28) is woven diagonally with respect to the longitudinal axis (30) of the hollow element (10).

9. A flexible hose in accordance with claim 8, characterized in that said fabric layer (28) has filaments which are woven at an angle of 45° with respect to the longitudinal axis (30).

10. A flexible hose in accordance with claim 6, characterized in that said fabric layer (28) is placed around said interior layer (18).

11. A flexible hose in accordance with claim 6, characterized in that said fabric layer (28) is diagonally wound around said interior layer (18).

12. A flexible hose in accordance with claim 6, characterized in that said fabric layer (28) is woven onto said interior layer (18).

13. A flexible hose in accordance with claim 6, characterized in that said fabric layer (28) is pulled as a shrinkable hose onto said interior layer (18).

14. A flexible hose in accordance with claim 6, characterized in that said fabric layer (28) consists of multiple layers (28', 28").

15. A flexible hose in accordance with claim 14, characterized in that said fabric layer (28) comprises two layers (28', 28").

16. A flexible hose in accordance with claim 6, characterized in that said fabric layer (28) is embedded within one of said interior layer or said third layer.

17. A flexible hose in accordance with claim 6, characterized in that said mesh width is smaller than volatile molecules of carbon dioxide coolant.

18. A flexible hose for the transport of media comprising an interior layer, a blocking layer and a third layer outwardly from said blocking layer, said interior layer defining a space for the flow of said medium characterized in that said blocking layer is impermeable to the volatile molecules of the medium to be transported and is configured as a plurality of fabric layers (28) encircling said space, said fabric layer comprising a first layer (28') having a first weave structure and a second layer (28") having a different weave structure than said first weave structure.

* * * * *